(12) United States Patent
Wang et al.

(10) Patent No.: US 6,815,860 B2
(45) Date of Patent: Nov. 9, 2004

(54) HIGH TEMPERATURE SUPER-CONDUCTING ROTOR COIL SUPPORT WITH SPLIT COIL HOUSING AND ASSEMBLY METHOD

(75) Inventors: Yu Wang, Clifton Park, NY (US); Robert John Nygard, Saratoga Springs, NY (US); Evangelos Trifon Laskaris, Schenectady, NY (US); James Pellegrino Alexander, Ballston Lake, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/413,216

(22) Filed: Apr. 15, 2003

(65) Prior Publication Data
US 2003/0173862 A1 Sep. 18, 2003

Related U.S. Application Data

(62) Division of application No. 09/854,933, filed on May 15, 2001, now Pat. No. 6,570,292.

(51) Int. Cl.[7] .................................................. H02K 3/48
(52) U.S. Cl. ........................... 310/214; 310/52; 310/54; 29/596
(58) Field of Search ........................... 310/214, 52, 270, 310/54; 29/596

(56) References Cited

U.S. PATENT DOCUMENTS

| | | | | |
|---|---|---|---|---|
| 4,277,705 A | * | 7/1981 | Rios ............................. 310/64 |
| 4,442,369 A | * | 4/1984 | Okamoto et al. ............ 310/214 |
| 4,642,503 A | * | 2/1987 | Ueda et al. .................. 310/214 |
| 5,532,663 A | * | 7/1996 | Herd et al. ................... 335/216 |
| 5,548,168 A | * | 8/1996 | Laskaris et al. .............. 310/52 |
| 5,672,921 A | * | 9/1997 | Herd et al. .................... 310/52 |
| 5,774,032 A | | 6/1998 | Herd et al. |
| 5,777,420 A | * | 7/1998 | Gamble et al. ............. 310/261 |
| 5,798,678 A | | 8/1998 | Manlief et al. |
| 5,953,224 A | | 9/1999 | Gold et al. |
| 6,066,906 A | * | 5/2000 | Kalsi ........................... 310/179 |
| 6,140,719 A | | 10/2000 | Kalsi |
| 6,169,353 B1 | * | 1/2001 | Driscoll et al. ............. 310/261 |
| 6,173,577 B1 | | 1/2001 | Gold |
| 2002/0125787 A1 | | 9/2002 | Howard et al. |
| 2003/0011253 A1 | | 1/2003 | Kalsi et al. |
| 2003/0011273 A1 | | 1/2003 | Kalsi et al. |
| 2003/0011452 A1 | | 1/2003 | Snitchler et al. |

OTHER PUBLICATIONS

Fast, Reactive Power Support, *HTS Generators,* American Superconductor™(Feb. 27, 2001)pp. 1–4.

* cited by examiner

*Primary Examiner*—Dang Le
*Assistant Examiner*—Nguyen N Hanh
(74) *Attorney, Agent, or Firm*—Nixon & Vanderhye P.C.

(57) ABSTRACT

A rotor is disclosed for a synchronous machine comprising: a rotor core; a super-conducting coil winding extending around at least a portion of the rotor, said coil winding having a side section adjacent a side of the rotor core; at least one tension rod extending through a conduit in said rotor core; and a housing attached to the tension rod and connected to the side section of the coil winding, wherein the housing comprises a pair of side panels.

5 Claims, 5 Drawing Sheets

HIGH TEMPERATURE SUPER-CONDUCTING ROTOR COIL SUPPORT WITH SPLIT COIL HOUSING AND ASSEMBLY METHOD

RELATED APPLICATIONS

This application is a divisional application of and claims priority to U.S. patent application Ser. No. 09/854,933, filed May 15, 2001, (now U.S. Pat. No. 6,570,292).

BACKGROUND OF THE INVENTION

The present invention relates generally to a super-conductive coil in a synchronous rotating machine. More particularly, the present invention relates to a coil support structure for super-conducting field windings in the rotor of a synchronous machine.

Synchronous electrical machines having field coil windings include, but are not limited to, rotary generators, rotary motors, and linear motors. These machines generally comprise a stator and rotor that are electromagnetically coupled. The rotor may include a multi-pole rotor core and one or more coil windings mounted on the rotor core. The rotor cores may include a magnetically-permeable solid material, such as an iron-core rotor.

Conventional copper windings are commonly used in the rotors of synchronous electrical machines. However, the electrical resistance of copper windings (although low by conventional measures) is sufficient to contribute to substantial heating of the rotor and to diminish the power efficiency of the machine. Recently, super-conducting (SC) coil windings have been developed for rotors. SC windings have effectively no resistance and are highly advantageous rotor coil windings.

Iron-core rotors saturate at an air-gap magnetic field strength of about 2 Tesla. Known super-conductive rotors employ air-core designs, with no iron in the rotor, to achieve air-gap magnetic fields of 3 Tesla or higher. These high air-gap magnetic fields yield increased power densities of the electrical machine, and result in significant reduction in weight and size of the machine. Air-core super-conductive rotors require large amounts of super-conducting wire. The large amounts of SC wire add to the number of coils required, the complexity of the coil supports, and the cost of the SC coil windings and rotor.

High temperature SC coil field windings are formed of super-conducting materials that are brittle, and must be cooled to a temperature at or below a critical temperature, e.g., 27° K, to achieve and maintain super-conductivity. The SC windings may be formed of a high temperature super-conducting material, such as a BSCCO ($Bi_xSr_xCa_xCu_xO_x$) based conductor.

Super-conducting coils have been cooled by liquid helium. After passing through the windings of the rotor, the hot, used helium is returned as room-temperature gaseous helium. Using liquid helium for cryogenic cooling requires continuous reliquefaction of the returned, room-temperature gaseous helium, and such reliquefaction poses significant reliability problems and requires significant auxiliary power.

Prior SC coil cooling techniques include cooling an epoxy-impregnated SC coil through a solid conduction path from a cryocooler. Alternatively, cooling tubes in the rotor may convey a liquid and/or gaseous cryogen to a SC coil winding that is immersed in the flow of the liquid and/or gaseous cryogen. However, immersion cooling requires the entire field winding and rotor structure to be at cryogenic temperature. As a result, no iron can be used in the rotor magnetic circuit because of the brittle nature of iron at cryogenic temperatures.

What is needed is a super-conducting field winding assemblage for an electrical machine that does not have the disadvantages of the air-core and liquid-cooled super-conducting field winding assemblages of, for example, known super-conductive rotors.

In addition, high temperature super-conducting (HTS) coils are sensitive to degradation from high bending and tensile strains. These coils must undergo substantial centrifugal forces that stress and strain the coil windings. Normal operation of electrical machines involves thousands of start-up and shut-down cycles over the course of several years that result in low cycle fatigue loading of the rotor. Furthermore, the HTS rotor winding should be capable of withstanding 25% over-speed operation during rotor balancing procedures at ambient temperature, and notwithstanding occasional over-speed conditions at cryogenic temperatures during power generation operation. These over-speed conditions substantially increase the centrifugal force loading on the windings over normal operating conditions.

SC coils used as the HTS rotor field winding of an electrical machine are subjected to stresses and strains during cool-down and normal operation. They are subjected to centrifugal loading, torque transmission, and transient fault conditions. To withstand the forces, stresses, strains and cyclical loading, the SC coils should be properly supported in the rotor by a coil support system. These coil support systems hold the SC coil(s) in the HTS rotor and secure the coils against the tremendous centrifugal forces due to the rotation of the rotor. Moreover, the coil support system protects the SC coils, and ensures that the coils do not prematurely crack, fatigue or otherwise break.

Developing support systems for HTS coils has been a difficult challenge in adapting SC coils to HTS rotors. Examples of coil support systems for HTS rotors that have previously been proposed are disclosed in U.S. Pat. Nos. 5,548,168; 5,532,663; 5,672,921; 5,777,420; 6,169,353, and 6,066,906. However, these coil support systems suffer various problems, such as being expensive, complex and requiring an excessive number of components. There is a long-felt need for a HTS rotor having a coil support system for a SC coil. The need also exists for a coil support system made with low cost and easy-to-fabricate components.

BRIEF SUMMARY OF THE INVENTION

A coil support system has been developed for a racetrack shaped, high temperature super-conducting (HTS) coil winding for a two-pole rotor of an electrical machine. The coil support system prevents damage to the coil winding during rotor operation, supports the coil winding with respect to centrifugal and other forces, and provides a protective shield for the coil winding. The coil support system holds the coil winding with respect to the rotor. The HTS coil winding and coil support system are at cryogenic temperature while the rotor is at ambient temperature.

The split-housing coil support is particularly useful for a low power density High Temperature Super-conducting (HTS) electric machine. The coil support withstands the high centrifugal and tangential forces that would otherwise act on the SC coil. The coil housings are positioned end-to-end along the long side sections of the coil winding in order to evenly distribute the centrifugal and tangential forces that act on the coil. To reduce the heat leakage, the mass of the coil support has been minimized to reduce thermal conduction from the rotor through support into the cold coil. The coil support is maintained at cryogenic temperatures, as is the field winding.

The coil support system includes a series of coil support assemblies that span between opposite sides of the racetrack coil winding. Each coil support assembly includes a tension rod and a pair of split coil housings. The tension rods extend between opposite sides of the coil winding through conduits, e.g., holes, in the rotor core. A split coil housing at each end of the tension rod attaches to the coil. The housing transfers centrifugal forces from the coil to the tension rod. Each coil support assembly braces the coil winding with respect to the rotor core. The series of coil support assemblies provides a solid and protective support for the coil winding.

Each split coil housing comprises a pair of opposite side panels that are assembled around the SC coil and grasps an end of the tension rod. The side panels are "C" shape pieces which are fastened together by bolts to enclose the coil between a pair of side panels. Clamping bolts hold the side panels together and prevent the coil housing from splitting under large centrifugal and tangential loads.

The HTS rotor may be for a synchronous machine originally designed to include SC coils. Alternatively, the HTS rotor may replace a copper coil rotor in an existing electrical machine, such as in a conventional generator. The rotor and its SC coils are described here in the context of a generator, but the HTS coil rotor is also suitable for use in other synchronous machines.

The coil support system is useful in integrating the coil support system with the coil and rotor. In addition, the coil support system facilitates easy pre-assembly of the coil support system, coil and rotor core prior to final rotor assembly. Pre-assembly reduces coil and rotor assembly time, improves coil support quality, and reduces coil assembly variations.

In a first embodiment, the invention is a rotor for a synchronous machine comprising: a rotor core; a superconducting coil winding extending around at least a portion of the rotor core, the coil winding having a side section adjacent a side of the rotor core; at least one tension rod extending through a conduit in the rotor core; and a housing attached to the tension rod and connected to the side section of the coil winding, wherein the housing comprises a pair of side panels.

In another embodiment, the invention is a method for supporting a super-conducting coil winding in the rotor core of a synchronous machine comprising the steps of: extending a tension rod through a conduit in the rotor core; positioning the coil winding around the rotor core such that the tension rod and tension bolt span between side sections of the coil winding; assembling a pair of side panels of at least one housing around a side section of the coil winding; securing side panels together, and attaching the housing to a first end of the tension rod.

BRIEF DESCRIPTION OF THE DRAWINGS

The accompanying drawings in conjunction with the text of this specification describe an embodiment of the invention.

DETAILED DESCRIPTION OF THE INVENTION

Figure 1:
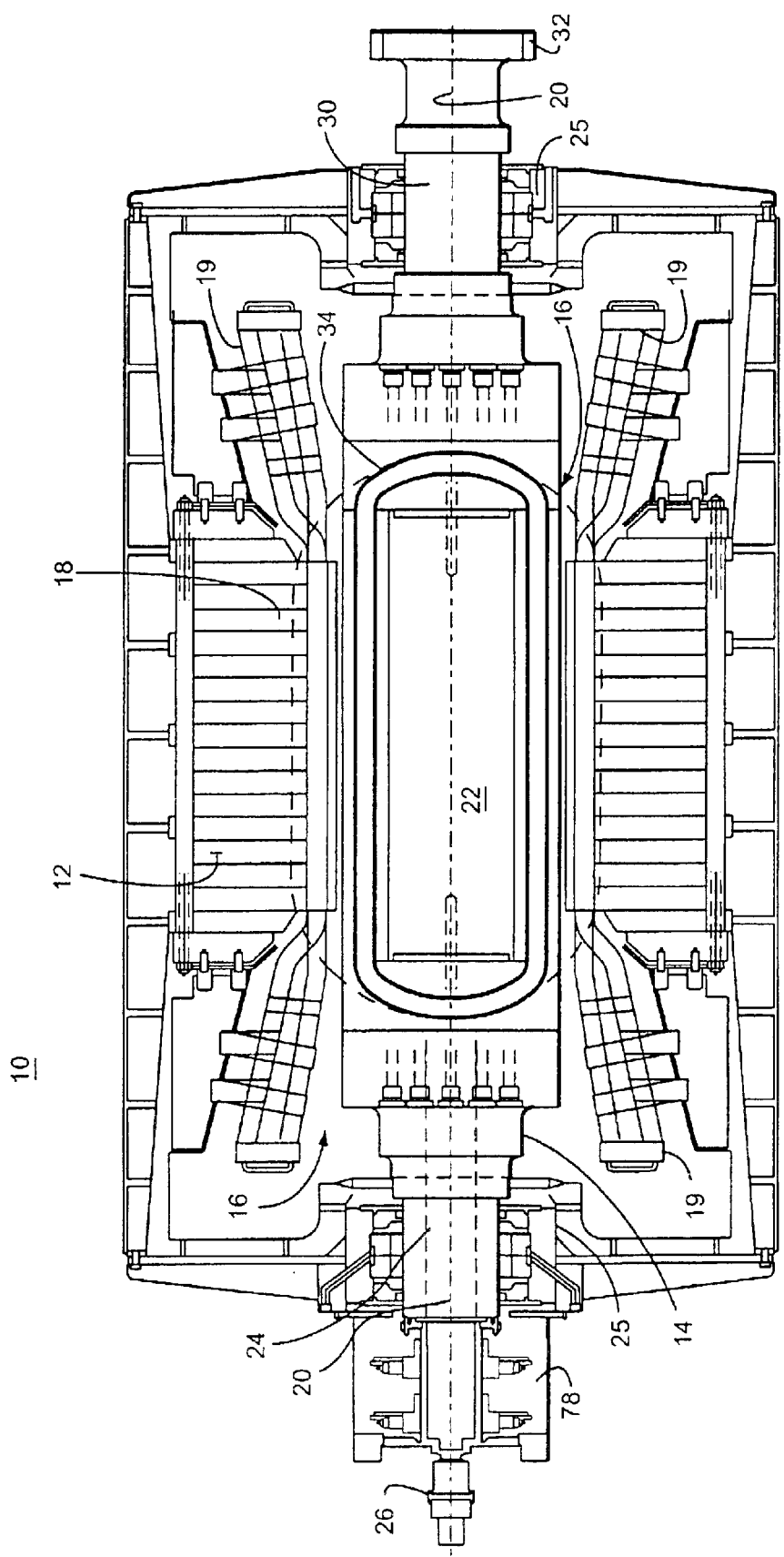
FIG. 1 is a schematic side elevational view of a synchronous electrical machine having a super-conductive rotor and a stator.

FIG. 1 shows an exemplary synchronous generator machine 10 having a stator 12 and a rotor 14. The rotor includes field winding coils that fit inside the cylindrical rotor vacuum cavity 16 of the stator. The rotor fits inside the rotor vacuum cavity of the stator. As the rotor turns within the stator, a magnetic field 18 (illustrated by dotted lines) generated by the rotor and rotor coils moves/rotates through the stator and creates an electrical current in the windings of the stator coils 19. This current is output by the generator as electrical power.

The rotor 14 has a generally longitudinally-extending axis 20 and a generally solid rotor core 22. The solid core 22 has high magnetic permeability, and is usually made of a ferromagnetic material, such as iron. In a low power density super-conducting machine, the iron core of the rotor is used to reduce the magnetomotive force (MMF). The reduced MMF minimizes the amount of super-conducting (SC) coil wire needed for the coil winding. For example, the solid iron-rotor core may be magnetically saturated at an air-gap magnetic field strength of about 2 Tesla.

Figure 2:
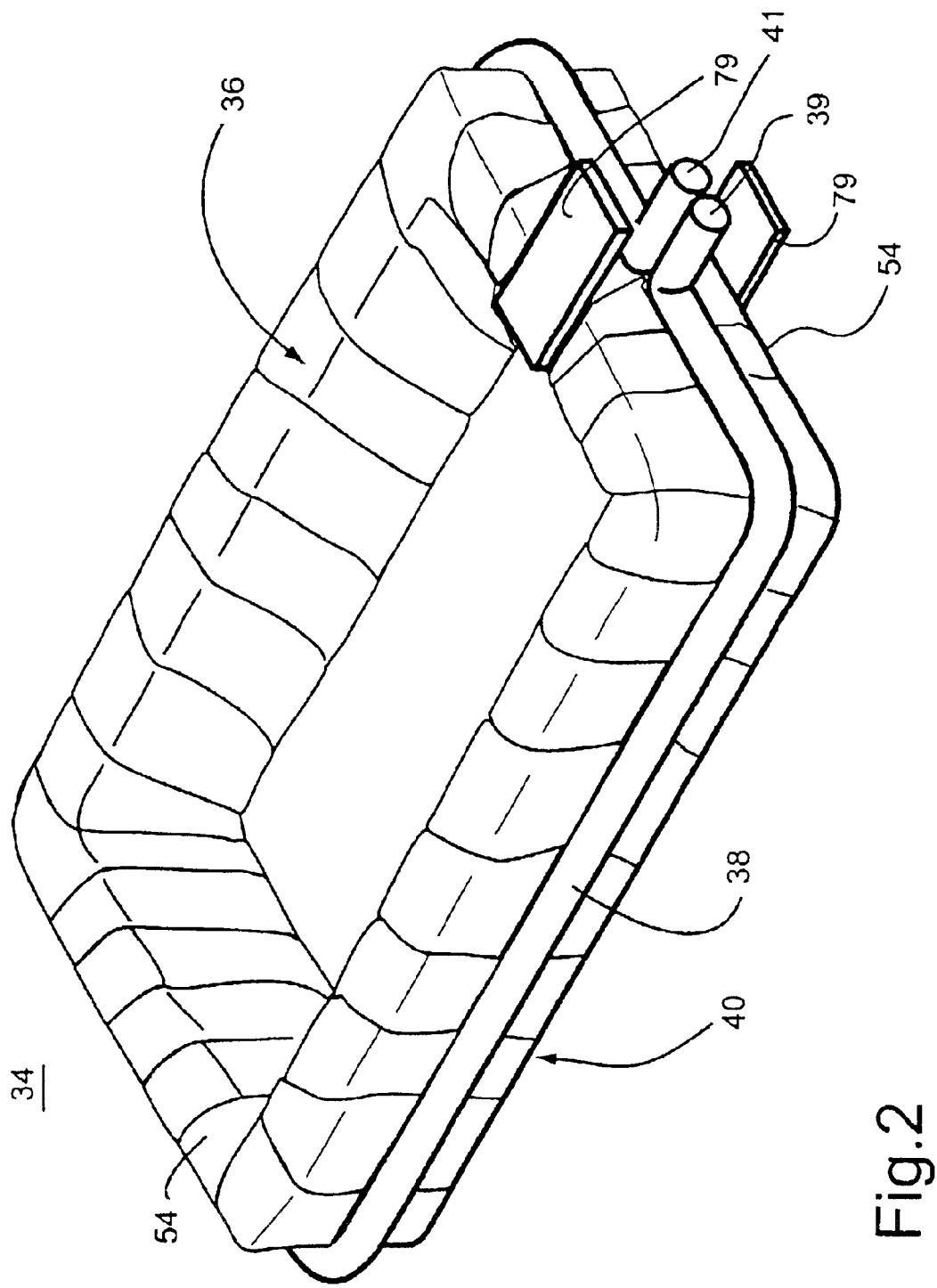
FIG. 2 is a perspective view of an exemplary racetrack super-conducting coil winding.

The rotor 14 supports at least one longitudinally-extending, racetrack-shaped, high-temperature superconducting (HTS) coil winding 34 (See FIG. 2). The HTS coil winding may be alternatively a saddle-shape or have some other shape that is suitable for a particular HTS rotor design. A coil support system is disclosed here for a racetrack SC coil winding. The coil support system may be adapted for coil configurations other than a racetrack coil mounted on a solid rotor core.

The rotor includes a pair of end shafts that bracket the rotor core 22. A collector end shaft 24 has collector rings 78 that provide an external electrical coupling for the SC coil. The collector end shaft also includes a cryogen transfer coupling 26 to a source of cryogenic cooling fluid used to cool the SC coil windings in the rotor. The cryogen transfer coupling 26 includes a stationary segment coupled to a source of cryogen cooling fluid and a rotating segment which provides cooling fluid to the HTS coil. The opposite end shaft is a drive shaft 30 that may be connected to a power turbine. The end shafts are supported by bearings 25 that provide supports for the entire rotor.

FIG. 2 shows an exemplary HTS racetrack field coil winding 34. The SC field winding coils 34 of the rotor includes a high temperature super-conducting (SC) coil 36. Each SC coil includes a high temperature super-conducting conductor, such as a BSCCO ($Bi_xSr_xCa_xCu_xO_x$) conductor wires laminated in a solid epoxy impregnated winding composite. For example, a series of BSCCO 2223 wires may be laminated, bonded together and wound into a solid epoxy impregnated coil.

SC wire is brittle and easy to be damaged. The SC coil is typically layer wound SC tape that is epoxy impregnated. The SC tape is wrapped in a precision coil form to attain close dimensional tolerances. The tape is wound around in a helix to form the racetrack SC coil 36.

The dimensions of the racetrack coil are dependent on the dimensions of the rotor core. Generally, each racetrack SC coil encircles the magnetic poles of the rotor core, and is parallel to the rotor axis. The coil windings are continuous around the racetrack. The SC coils form a resistance-free electrical current path around the rotor core and between the magnetic poles of the core. The coil has electrical contacts 79 that electrically connect the coil to the collector 78.

Fluid passages 38 for cryogenic cooling fluid are included in the coil winding 34. These passages may extend around an outside edge of the SC coil 36. The passageways provide cryogenic cooling fluid to the coil and remove heat from the coil. The cooling fluid maintains the low temperatures, e.g., 27° K, in the SC coil winding needed to promote superconducting conditions, including the absence of electrical resistance in the coil. The cooling passages have an input fluid port 39 and output fluid port 41 at one end of the rotor core. These fluid (gas) ports 39, 41 connect the cooling passages 38 on the SC coil to tubes in the rotor end shaft 24 that extend to the cryogen transfer coupling 26.

Each HTS racetrack coil winding 34 has a pair of generally-straight side portions 40 parallel to a rotor axis 20, and a pair of end portions 54 that are perpendicular to the rotor axis. The side portions of the coil are subjected to the greatest centrifugal stresses. Accordingly, the side portions are supported by a coil support system that counteract the centrifugal forces that act on the coil.

Figure 3:
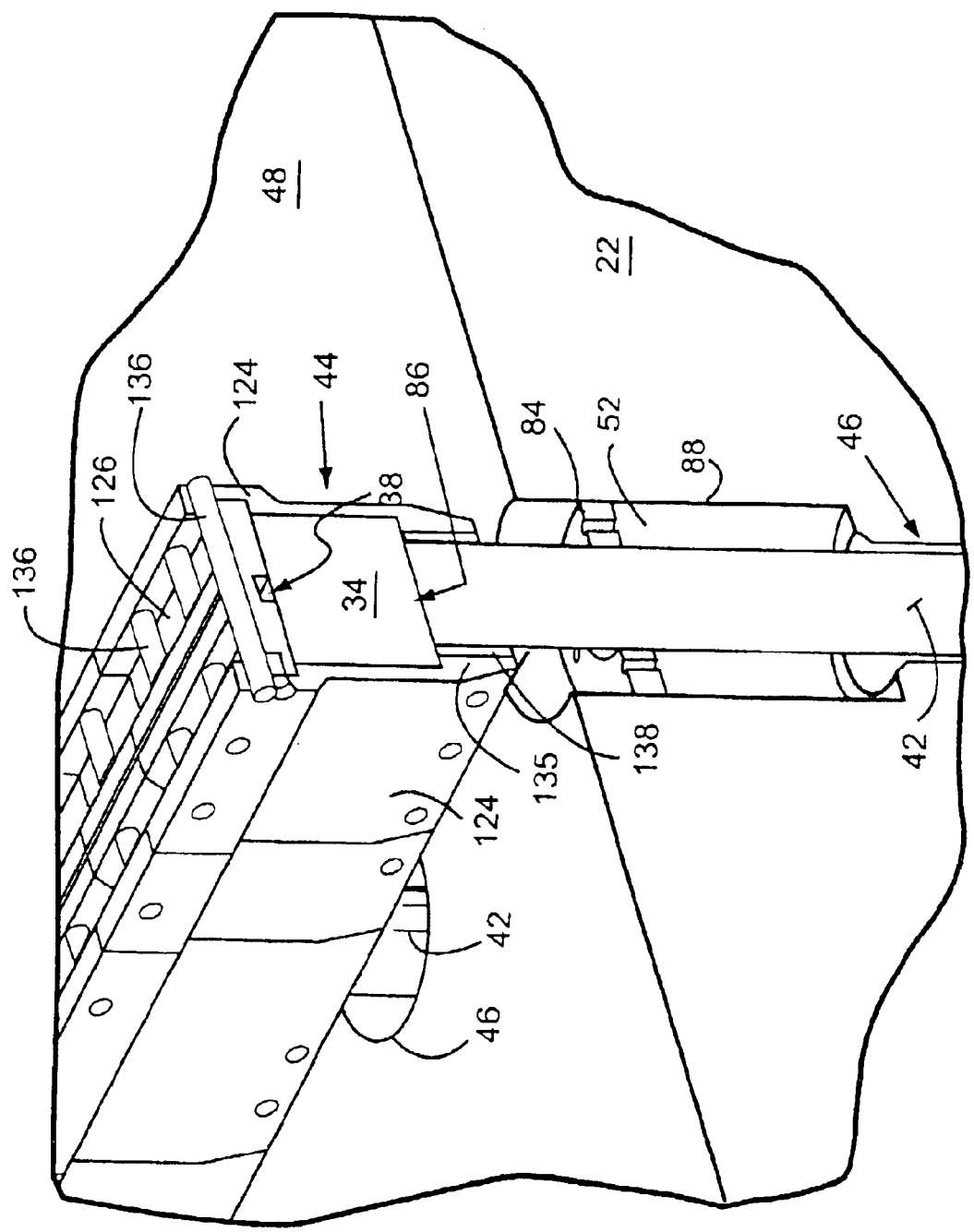
FIG. 3 is a partially cut-away view of the rotor core, coil winding and coil support system for a high temperature super-conducting (HTS) rotor.

FIG. 3 shows a partially cut-away view of a rotor core 22 and coil support system for a high temperature superconducting (HTS) coil winding. The coil support systems includes a series of coil support assemblies spanning through the rotor core and between opposite sides of the HTS coil winding. Each coil support assembly comprises a tension rod 42 that extends through a conduit 46 of the rotor core, and a split coil housing 44 that is fastened to the rod and brackets the coil winding. The coil support system provides a structural frame to hold the coil winding in the rotor.

The principal loading of the HTS coil winding 34 is from centrifugal acceleration during rotor rotation. The coil support assemblies are each aligned with the centrifugal loading of the coil to provide effective structural support to the coil winding under load. To support the side sections of the coil, each tension rod 42 attaches to the split coil housings 44. The housings grasp opposite side sections of the coil. The tension rods 42 extend through a series of conduits 46 in the rotor core. These rods are aligned with the quadrature axis of the rotor core.

The split coil housings 44 support the coil winding 34 against centrifugal forces and tangential torque forces. Centrifugal forces arise due to the rotation of the rotor. Tangential forces may arise from acceleration and deceleration of the rotor, and torque transmission. Because the long sides 40 of the coil winding are encased by the split coil housings 44 and the flat ends 86 of the tension bolts, the sides of the coil winding are fully supported within the rotor.

The conduits 46 are generally cylindrical passages in the rotor core having a straight axis. The diameter of the conduits is substantially constant. However, the ends 88 of the conduits may expand to a larger diameter to accommodate an insulating tube 52. This tube aligns the rod 42 in the conduit and provides thermal isolation between the rotor core and the rod.

At the end of each tension rod, the insulating tube 52 fastens the coil support structure to the hot rotor and prevents heat convection therebetween. Additionally, there is a lock-nut 84 connected to the insulating tube 52, that further secures the connection with the tension rod. The lock-nut 84 and the tube 52 secure the tension rod and split housing to the rotor core while minimizing the heat transfer from the hot rotor to the housing structure.

The insulator tube 52 is formed of a thermal insulation material. One end of the tube may include an external ring (not shown) that abuts the wall of the wide end 88 of the conduit. The other end of the tube includes an internal ring (not shown) that engages the lock-nut 84 holding the tension rod to the insulating tube. Heat from the rotor would have to conduct through the length of the insulator tube 52 and the lock-nut 84 before reaching the tension rod. Thus, the insulator tube thermally isolates the tension rod from the rotor core.

The number of conduits 46 and their location on the rotor core depends on the location of the HTS coils and the number of coil housings needed to support the side sections of the coils. The axes of the conduits 46 are generally in a plane defined by the racetrack coil. In addition, the axes of the conduits are perpendicular to the side sections of the coil. Moreover, the conduits are orthogonal to and intersect the rotor axis, in the embodiment shown here. The number of conduits and the location of the conduits will depend on the location of the HTS coils and the number of coil housings needed to support the side sections of the coils.

There are generally two categories of support for superconducting winding: (i) "warm" supports and (ii) "cold" supports. In a warm support, the supporting structures are thermally isolated from the cooled SC windings. With warm coil supports, most of the mechanical load of a superconducting (SC) coil is supported by structural members that span between the cold coils and the warm support members.

In a cold coil support system, the support system is at or near the cold cryogenic temperature of the SC coils. In cold supports, most of the mechanical load of a SC coil is supported by the coil support structural members which are at or near cryogenic temperature.

The exemplary coil support system disclosed here is a cold support in that the tension rods 42, bolts 43 and associated split housings 44 are maintained at or near a cryogenic temperature. Because the coil support members are cold, these members are thermally isolated, e.g., by the non-contact conduits through the rotor core, from the rotor core and other "hot" components of the rotor.

The HTS coil winding and structural coil support components are all at cryogenic temperature. In contrast, the rotor core is at an ambient "hot" temperature. The coil supports are potential sources of thermal conduction that would allow heat to reach the HTS coils from the rotor core. The rotor core becomes hot during operation. As the coil windings are to be held in super-cooled conditions, heat conduction into the coils from core is to be avoided.

The coil support system is thermally isolated from the rotor core. For example, the tension rods and bolts are not in direct contact with the rotor. This lack of contact avoids the conduction of heat from the rotor to the tension rods and coils. In addition, the mass of the coil support system structure has been minimized to reduce the thermal conduction through the support assemblies into the coil windings from the rotor core.

Each tension rod 42 is a shaft with continuity along the longitudinal direction of the rod and in the plane of the racetrack coil. The tension rod is typically made of high strength non-magnetic alloys such as aluminum or an Inconel alloy. The longitudinal continuity of the tension rods provides lateral stiffness to the coils which provides rotor dynamics benefits. Moreover, the lateral stiffness of the tension rods 42 permits integrating the coil support with the coils so that the coil can be assembled with the coil support on the rotor core prior to final rotor assembly.

The flat surface 86 head of the tension rod supports an inside surface of a side of the coil winding. The end 86 of the tension rod may be serrated so that it may be engaged into the annular ridges 134 of an assembly of two coil housing side panels 124 (see FIG. 5). The other three surfaces of the side 40 of the coil winding are supported by the split housing 44. Each split housing is assembled around the coil and forms a coil casing in cooperation with the bolt head. This casing supports the coil winding with respect to tangential and centrifugal loads. The casing also allows the coil winding to expand and contract longitudinally.

Figure 5:
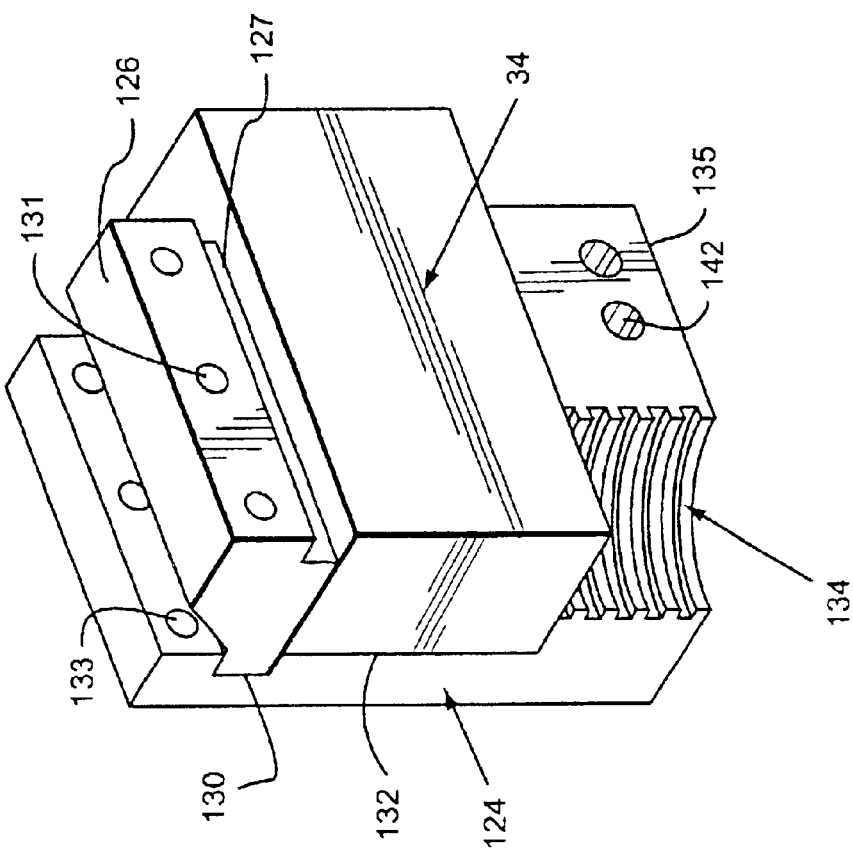
FIGS. 4 and 5 are perspective views of a split coil housing having a coil (FIG. 5) and without a coil (FIG. 4).
Figure 4:
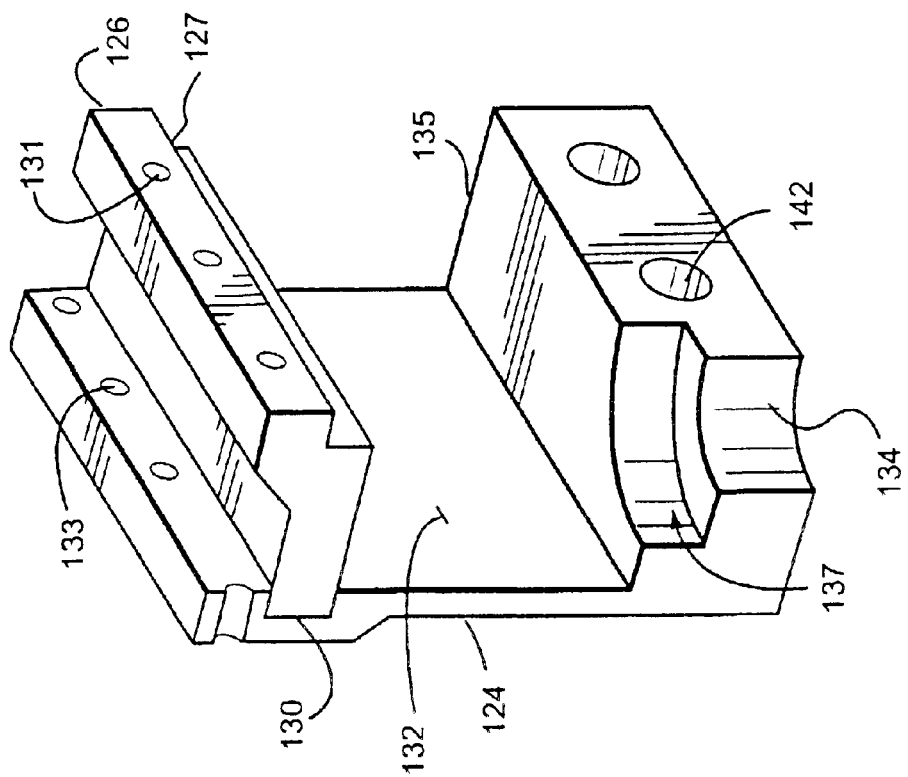

FIGS. 4 and 5 (and FIG. 3) show one-half of exemplary "C" shaped side panels 124 of the split housing 44. A pair of side panels brackets opposite sides of a coil 34. Moreover, side panels are arranged end-to-end along each side of a coil to form a continuous coil support assembly along a side section 40 of a coil winding 34. An inside surface of each side panel has a narrow slot 130 to receive the wedge and an "L" shaped channel 132 to receive a side of the coil. A side surface and an inner surface of the coil rests on orthogonal surfaces of the channel 132 of the side panel. An opposite side panel is assembled around the coil and supports the same inner coil surface and an opposite coil side surface.

The outside surface of the coil is supported by a wedge 126 that extends between the side panels on opposite sides of the coil. An individual wedge may be split (as shown in FIGS. 4 and 5) and extend half-way across the coil where it abuts with another split wedge. The wedge 126 fits into the narrow slot 130 of a side panel. The wedge includes a channel 127 to receive the cooling passage 38 on the outside surface of the coil. Further the wedge may include a series of holes 131 that are aligned with holes 133 at the top edge of the side panel. Each pair of these holes 131, 133 receive locking pins 136 (FIG. 3) that extend through the opposite side panels and wedges to clamp the top edges of the side panels and wedges together.

The wedge may be integral to the side panel and extend one-half the width of the coil, as shown in FIG. 4. Alternatively, the wedge may be a separate component that is assembled with the side panel and may extend one half or the entire distance across the width of the coil to an opposite side panel. In addition, the wedge 126 need not be coextensive with the side panel. The wedge may extend beyond the length of a side panel and engage a slot 130 in an adjacent side panel (as shown in FIG. 4). Alternatively, the wedge may be coextensive with the side panel, as is shown in FIG. 5.

The side panels 124 have a lower flange 135 on which rests the inside surface of the coil. Bolt holes 142 in the lower flange allow for clamping bolts to hold together the lower portion of the housing 44. The lower flange also engages the tension rod 42 or tension bolt 43 (depending on whether a solid tension rod is used or a tension rod and bolt assembly is being used).

Each side panel (one-half is shown in FIGS. 4 and 5) has a half section 134 of a hole to engage a tension rod or tension bolt. The side panels shown in FIGS. 4 and 5 have a half section 134 that forms a hole (when assembled with two pair of side panels) to engage a serrated end of the tension rod 42 (FIG. 5) or the head of a tension bolt 43 (FIG. 4). The hole formed by the side panel shown in FIG. 4 has a smooth bore and an annular ledge 137 to engage the head of bolt 43. Alternatively, the hole formed by half section 134 of the side panel shown in FIG. 5 is serrated and engages the serrated end of a tension rod. Accordingly, the split housing 44 may be used with either a tension rod and bolt assembly, or a tension rod without a bolt. Further, a lock-nut 138 (see FIG. 6) may be inserted into the threaded hole 134 and the lock-nut may have an interior hole and ledge to securely hold a tension bolt head 43.

Regardless of the manner in which the tension bolt or tension rod is attached to the lower flange 135 of the side panel, the end of the bolt or rod is secured so as to abut the inside surface of the coil. In this way the end of the tension bolt or rod directly supports the coil.

The split housing may be made of light, high strength material that is ductile at cryogenic temperatures. Typical materials for the split housings are aluminum, titanium, and Inconel alloys. The shape of the split housing has been optimized for low weight.

Figure 6:
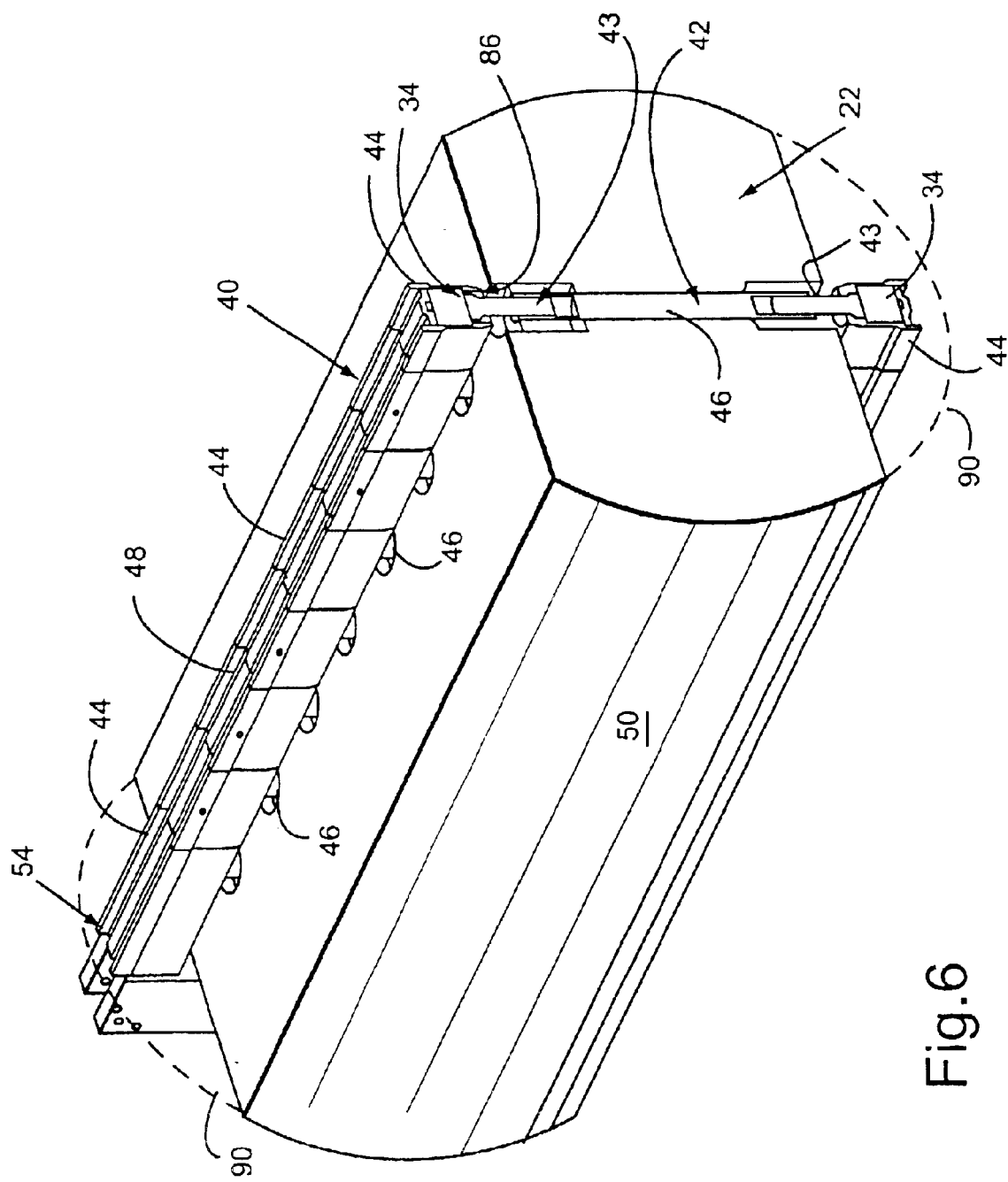
FIG. 6 is a perspective view of the rotor core, coil winding and coil support system for a high temperature superconducting (HTS) rotor.

As shown in FIG. 6, a series of split coil housings 44 (and associated tension bolts 43 and rods 42) may be positioned along the sides 40 of the coil winding. The tension bolts 43 screw into threaded holes (not shown) in the end of the tension rod. The depth to which the bolt screws into the rod is adjustable. The total length of the tension rod and bolt assembly (which assembly spans between the sides of the coil) can be changed by turning one or both of the bolts into or out of the holes of the tension rods. The head of the bolt or the end of the tension rod includes a flange with a flat outer surface 86. The flange engages the rim of the split housing shown in FIG. 4. The flat head 86 of the bolt or rod abuts an inside surface of the coil winding 34.

The housings are arranged end-to-end along the length of the side portion 40 of the coil. The split housings collectively distribute the forces that act on the coil, e.g., centrifugal forces, over substantially the entire side sections 40 of the coil. The split housings 44 prevent the coil side sections 40 from excessive flexing and bending due to centrifugal forces.

The plurality of split housings 44 effectively hold the coil in place without affectation by centrifugal forces. Although the split housings are shown as having a close proximity to one another, the housings need only be as close as necessary to prevent degradation of the coil caused by high bending and tensile strains during centrifugal loading, torque transmission, and transient fault conditions.

The coil supports do not restrict the coils from longitudinal thermal expansion and contraction that occur during normal start/stop operation of the gas turbine. In particular, thermal expansion is primarily directed along the length of the side sections. Thus, the side sections of the coil slide slightly longitudinally with respect to the split housing and tension rods.

The coil support system of tension rods 42, bolts 43 and split housings 44 may be assembled with the HTS coil windings 34 as they are mounted on the rotor core 22. The tension rods and split housings provide a fairly rigid structure for supporting the coil winding and holding the long sides of the coil winding in place with respect to the rotor core. The ends of the coil may be supported by split clamps (not shown) at the axial ends of (but not in contact with) the rotor core 22.

The rotor core and end shafts may be discrete components that are assembled together. The iron rotor core 22 has a generally cylindrical shape 50 suitable for rotation within the rotor cavity 16 of the stator 12. To receive the coil winding, the rotor core has recessed surfaces 48, such as flat or triangular regions or slots. These surfaces 48 are formed in the curved surface 50 of the cylindrical core and extending longitudinally across the rotor core. The coil winding 34 is mounted on the rotor adjacent the recessed areas 48. The coils generally extend longitudinally along an outer surface of the recessed area and around the ends of the rotor core. The recessed surfaces 48 of the rotor core receive the coil winding. The shape of the recessed area conforms to the coil winding. For example, if the coil winding has a saddle-shape or some other shape, the recess(es) in the rotor core would be configured to receive the shape of the winding.

The recessed surfaces 48 receive the coil winding such that the outer surface of the coil winding extends to substantially an envelope defined by the rotation of the rotor. The outer curved surfaces 50 of the rotor core when rotated define a cylindrical envelope. This rotation envelope of the rotor has substantially the same diameter as the vacuum rotor cavity 16 (see FIG. 1) in the stator.

The gap between the rotor envelope and stator cavity 16 is a relatively-small clearance, as required for forced flow ventilation cooling of the stator only, since the rotor requires no ventilation cooling. It is desirable to minimize the clearance between the rotor and stator to increase the electromagnetic coupling between the rotor coil windings and the stator windings. Moreover, the rotor coil winding is preferably positioned such that it extends to the envelope formed by the rotor and, thus, is separated from the stator by only the clearance gap between the rotor and stator.

The rotor core, coil windings and coil support assemblies are pre-assembled. Pre-assembly of the coil and coil support reduces production cycle, improves coil support quality, and reduces coil assembly variations. Before the rotor core is assembled with the rotor end shafts and other components of the rotor, the tension rods 42 are inserted into each of the conduits 46 that extend through the rotor core. The insulator tube 52 at each end of each tension rod is placed in the expanded end 88 at each end of the conduits 46. The tube 52 is locked in place by a retainer locking-nut 84. The bolts 43, if used, may be inserted before or after the tension rods are inserted into the rotor core conduits.

When using tension bolts, then a locking nut 138 is placed on each bolt and then used to secure the bolt against the split housing. The depth to which the bolts are screwed into the tension rods is selected such that the length from the end of one bolt on a tension rod to the end of the opposite bolt is the distance between the long sides 40 of the coil winding. When the tension rods and bolts are assembled in the rotor core 22, the coil windings 34 are ready to be inserted onto the core.

The coil winding 34 is inserted onto the rotor core such that the flat ends 86 of the tension rods 42 or bolts 43 abut the inside surface of the side sections 40 of the winding. Once the winding has been inserted over the ends of the rod 42 or bolt 43, the split housings 44 are assembled over the winding. To assemble each housing, the side panels are placed against opposite sides of the coil, and the wedges are slid into the narrow slots 130 of the side panels. The lock pin is inserted to hold the wedges and the side panels together. The lock-nut 138 is used to tighten the side panels against the bolt.

The rotor core may be encased in a metallic cylindrical shield 90 (shown by dotted lines) that protects the super-conducting coil winding 34 from eddy currents and other electrical currents that surround the rotor and provides a vacuum envelope to maintain a hard vacuum around the cryogenic components of the rotor. The cylindrical shield 90 may be formed of a highly-conductive material, such as a copper alloy or aluminum.

The SC coil winding 34 is maintained in a vacuum. The vacuum may be formed by the shield 90 which may include a stainless steel cylindrical layer that forms a vacuum vessel around the coil and rotor core.

The coil split housings, tension rods and bolts (coil support assembly) may be assembled with the coil winding before the rotor core and coils are assembled with the collar and other components of the rotor. Accordingly, the rotor core, coil winding and coil support system can be assembled as a unit before assembly of the other components of the rotor and of the synchronous machine.

While the invention has been described in connection with what is presently considered to be the most practical and preferred embodiment, it is to be understood that the invention is not to be limited to the disclosed embodiment, but on the contrary, is intended to cover all embodiments within the spirit of the appended claims.

What is claimed is:

1. A method for supporting a super-conducting coil winding in the rotor core of a synchronous machine comprising:
    a. extending a tension rod through a conduit in said rotor core;
    b. positioning the coil winding around the rotor core such that the tension rod spans between side sections of the coil winding;
    c. assembling a pair of side panels of at least one housing around a side section of the coil winding;
    d. securing side panels together, and
    e. attaching the housing to a first end of the tension rod.

2. A method as in claim 1 further comprising repeating steps (c) and (d) to secure a second housing around the side section of the coil to a second end of the tension rod.

3. A method as in claim 1 wherein step (c) is performed by assembling a plurality of side panels around an a flange head at an end of the tension rod.

4. A method as in claim 1 wherein step (c) is performed by assembling a plurality of side panels to form a serrated hole and engaging a serrated end of the tension rod into the hole.

5. A method as in claim 1 wherein several tension rods are inserted into a series of conduits in the rotor core and secured to the coil winding.

* * * * *